United States Patent [19]

Fukumoto et al.

[11] 3,717,486

[45] Feb. 20, 1973

[54] FOAMED PRODUCTS OF SILICA AND MANUFACTURING THE SAME FROM SILICA GEL

[75] Inventors: Kenichi Fukumoto; Tokunori Nakamura; Kenji Kadota, all of Ibaragi-shi, Osaka, Japan

[73] Assignee: Shikoku Kaken Kogyo Kabushshiki Kaisha, Ibaragi-shi, Osaka-fu, Japan

[22] Filed: Nov. 23, 1970

[21] Appl. No.: 92,150

[30] Foreign Application Priority Data

Nov. 24, 1969 Japan..........................44/94560

[52] U.S. Cl.....................106/40 V, 252/451, 264/43
[51] Int. Cl. ..........................................B01j 11/56
[58] Field of Search.............264/43; 106/40 R, 40 V; 252/451

[56] References Cited

UNITED STATES PATENTS

| | | | |
|---|---|---|---|
| 2,645,619 | 7/1953 | Hoekstra | 252/451 X |
| 2,883,347 | 4/1959 | Fisher et al. | 106/40 R UX |
| 2,900,349 | 8/1959 | Schwartz | 252/451 X |
| 3,397,153 | 8/1968 | Sippel | 252/451 X |

*Primary Examiner*—Philip E. Anderson
*Attorney*—Larson, Taylor & Hinds

[57] ABSTRACT

A method for manufacturing foamed product of silica from silica gel comprises prefiring silica gel at a temperature ranging from 500 to 900°C so as to obtain a prefired product which can be ignited with a loss of not more than 5 percent by weight, the silica gel having a specific surface area of at least 500 m²/g and being of a size not passing through an 80-mesh sieve and substantially free of adsorption water, and thereafter firing the prefired product at a temperature ranging from 1000 to 1450°C to effect foaming.

14 Claims, No Drawings

FOAMED PRODUCTS OF SILICA AND MANUFACTURING THE SAME FROM SILICA GEL

This invention relates to granular foamed products of silica and to a method for producing the same from silica gel.

Silica gel has excellent fireproof and heat resisting properties, chemical stability, large specific surface area and high hygroscopicity. Due to these characteristics, silica gel finds applications as drying agent, catalyst carrier and the like. On the other hand, the inherent property of excess hygroscopicity results in a drawback that in the presence of water it absorbs water rapidly and is spontaneously broken to pieces. This drawback poses limitation on the application, hence it is put to only a narrow range of uses.

An object of the present invention is to produce from silica gel foamed products which have no hygroscopicity but possesses fireproof, heat resisting, chemical stability and yet which are much more lightweight and attractive in appearance than silica gel, the products therefore being applicable to new uses.

Another object of this invention is to provide foamed products with foregoing characteristics which have a high degree of whiteness or which are colored in a desired color so as to be applicable for a wide variety of uses as building materials, aggregates for paints, and the like and to provide a method for producing the same from silica gel.

In order to fulfill these objects the present inventors have carried out extensive studies on a method for foaming silica gel by heating. During the researches conducted, difficulties were encountered in that cracks or breakage developed or large pores were locally produced in the course of heating. Indeed, it was found difficult to obtain a foamed product of silica which is crack-free and of uniform porous construction. While carrying out subsequent researches, it has been found that insofar as silica gel is heated under particular conditions, foamed products of silica can be obtained which are crack-free and have uniform and minute open or semi-closed pores in the interior thereof.

In accordance with the present invention, a foamed product of silica gel is produced by prefiring silica gel at 500 to 900°C so as to obtain a prefired product which can be ignited with a loss of not more than 5 percent by weight, the silica gel having a specific surface area of at least 500 m²/g and being of a size not passing through an 80-mesh sieve and substantially free of adsorption water, and thereafter firing the prefired product at 1000 to 1450°C to effect foaming.

In accordance with this invention, the ignition loss was measured by heating the sample at 1000°C for 2 hours and the specific surface area was measured by the BET method under the condition of 1-hour bake-out treatment at 300°C. As the adsorption gas used for the latter measurement, a nitrogen gas was used for starting silica gel and ethylene was used for the foamed product obtained.

The foamed product of silica obtained by this invention is a granule covered with a vitrified surface and having in its interior a great number of open or semi-closed pores which are defined by vitrified partitions. The pores are approximately 1 to 100 $\mu$ in diameter and distributed at a ratio of $1 \times 10^6$ to $1 \times 10^{12}$ pores/cm³. Due to the presence of these numerous pores, the foamed product of this invention has a bulk density as small as not more than 0.6 g/cm³. Since the granules are covered with vitrified surface, the product has a very small specific surface area of not more than 0.7 m²/g which corresponds to less than 1/700 the specific surface area of the starting silica gel, with the result that the hygroscopicity of the product is markedly lower than that of the starting gel. In fact the foamed product of this invention exhibits no hygroscopic action even when left under atmospheric conditions over a long period and shows only slight hygroscopicity of about 0.5 percent when left for 24 hours under a saturated steam pressure at 30°C. Further when immersed in water, rapid sorption of water which results in breakage does not take place although absorption of water may proceed slowly over a long period. Even in such instance, the product is not liable to variation in shape or deterioration of quality but remains very stable. Further the product has higher stability than silica gel in its resistance to chemicals, such as in acid and alkali resisting properties. Moreover the product has excellent luster on its vitrified surface and a foamed product obtained without using coloring material has a high degree of whiteness and looks almost pure-white and lustrous. A colored product also exhibits a desired color with luster. Being excellent in fireproof and heat resisting properties and having open or semi-closed cells in its interior, the product is lightweight and has outstanding abilities to insulate heat, keep warmth and absorb sound.

For these reasons, the foamed products of this invention can be used for various purposes wherein characteristics described above are essential. They are particularly useful as building materials and aggregates for paints. Although various materials have heretofore been proposed for use as building materials and aggregates of paints, they have drawbacks in that those of a lightweight have no luster on the surface while those with attractive appearance are not sufficiently lightweight. However the present foamed products are not only lightweight but also have a beautiful appearance. Accordingly, a building material incorporating the present product is lightweight and look beautiful, and a wall surface coated with a paint including this product provides an attractive appearance without adding to the weight. The present products further find versatile applications as heat insulating, refractory, warmth keeping, sound absorbing materials as well as for ornamental purposes.

It is desired that the foamed products of this invention generally have a specific surface area of 0.2 to 0.6 m²/g and a bulk density of 0.1 to 0.5 g/cm³ although these values may vary depending upon the use. The size of the pores in the interior of the foamed products, which may vary depending on foaming conditions, is preferably 1 to 100 $\mu$ in diameter and it is desired that the pores be present uniformly.

The present foamed products of this invention may assume versatile shapes depending upon the starting silica gel and foaming conditions. For instance, some are nearly precisely spherical, some are elliptical and others are in more complex shape. The size of the granular products also varies over a wide range and is generally from 0.2 mm to 25 mm in diameter. Depending upon the proposes, a product of a desired size and shape may be used or products of different size and shape may be used in mixture.

As the silica gel to be used in accordance with this invention, silica gel which is commercially available may be employed. For example, silica gel prepared by mixing sulfuric acid with an aqueous solution of sodium silicate to produce gelled silicic acid, removing the residual salt by washing with water, and then drying the gelled product. In accordance with this invention, it is required that the silica gel thus obtained be dried to such extent that it is substantially free of adsorption water. If the silica gel contains adsorption water, the water will be forced to scatter about during the subsequent step of prefiring to produce cracks or breakage, with the result that a satisfactory foamed product will not be produced. The adsorption water can be removed by heating silica gel, or subjecting it to reduced pressure or heating it under reduced pressure. Usually the silica gel may be dried by gradually raising a temperature to about 300°C in 1 to 5 hours under an atmospheric pressure for drying. At this stage the silica gel may be dried to such extent that the silica gel obtained will be ignited with a loss of about 5.0 to 10 percent by weight. It is required that the starting silica gel thus dried have a specific surface area of at least 500 m$^2$/g. With a silica gel having a smaller specific surface area it is impossible to effect satisfactory foaming and therefore to obtain a desired product. Preferably, the silica gel may have a specific surface area of 600 to 900 m$^2$/g. Those having a specific surface area in this range will result in desired foamed products. Furthermore, the particle size of the starting silica gel is also critical in producing a foamed product. It is required to use a silica gel of such particle size that the granules thereof do not pass through an 80-mesh sieve. If the particle size is smaller, satisfactory foaming can not be effected. Preferably, silica gel used may be of such particle size that the granules thereof pass through a 5-mesh sieve but do not pass through a 24-mesh sieve. When silica gel of uniform particle size is used, a foamed product of uniform size will be obtained.

In accordance with this invention, it is required to prefire the starting silica gel. The prefiring is conducted by heating silica gel at 500 to 900°C, whereby hydroxyl groups in the silica gel are released therefrom and water vapor is evaporated off to effect reduction in specific surface area. The researches carried out by the inventors have disclosed that the prefiring step is critical in producing a product which has been foamed uniformly and which is free of cracks or breakage. Where the starting silica gel is not prefired, cracks or breakages develop during firing step with a tendency of uneven foaming. It is desired to conduct prefiring at a temperature of 550 to 750°C. Prefiring is conducted for such a period of time that the prefired product, when ignited, will produce a loss of not more than 5 percent by weight, preferably of 0.5 to 2.5 percent by weight, although the prefiring time may be variable depending on the starting silica gel used and the firing temperature. Through prefiring, the specific surface area of silica gel will be reduced, the reduction being 1 to 80 percent, usually 10 to 50 percent of that of the starting silica gel.

The prefired product is then heated to 1000 to 1450°C for firing to effect foaming. It has been found by the researches of the inventors that the time required for elevating temperature from prefiring temperature level to firing temperature level exerts an influence on the strength of the surface of the foamed product obtained. This, the shorter the time for elevation of temperature, the higher is the surface strength of the resultant foamed product. It is preferable that temperature be elevated from the prefiring temperature to firing temperature within 20 minutes, more preferably within 10 minutes. If the elevation of temperature takes a longer period, the strength of surface obtained will be lower, but the resultant product can be used satisfactorily for the purposes where the requirement for the surface strength is not critical.

Although the mechanism by which foaming is effected during firing step conducted at 1000 to 1450°C is not fully clarified, it may presumably be as follows. Heating at the abovementioned temperature forms the surface with vitrified silica gel, while the silanol groups in silica gel are subjected to dehydration condensation to release water vapor, which expands vitrified silica gel in its entirety. During the firing process the silica gel is expanded to 1.5 to 10 times the original volume and retains this state upon cooling. Preferably, firing may be conducted at a temperature of 1100 to 1300°C. Firing atmosphere exerts hardly any influence on the expansion of the silica gel, so that firing can be conducted in a various kinds of gas such as air, inert gas or the like or in vacuum. Heating is conducted by suitable heating means such as an electric furnace or the like. Furthermore firing operation can be carried out in molten glass or molten metal. In such case, a unique product will be obtained which incorporates the present foamed product in its interior. After firing, the product is cooled by desired means.

The foamed product thus obtained are light-weight and have a high degree of whiteness almost close to pure-white. When it is desired to obtain colored, foamed products of silica, however, coloring materials may be added to the starting silica gel, whereby beautiful foamed products colored in desired color can be prepared. Employable coloring materials are water-soluble metal salts which are capable of producing colored oxidation products under firing conditions. They include water-soluble salts of iron, cobalt, copper, zinc, chromium, manganese, nickel, lead, etc., examples thereof being (1) $FeCl_3$, $Fe(OH)_3$, $Fe(NO_3)_3$, $Fe(NO_3)_2$ $Fe[Fe(CN)_6]$, $Fe_4[Fe(CN)_6]_3$, $(NH_4)_2Fe(SO_4)_2$, $Fe(CH_3COO)_3$, $K_3[Fe(CN)_6]$, $K_4[Fe(CN)_6]$, $FeSO_4 \cdot Al_2(SO_4)_3$, $Fe_2(SO_4)_3$ and like iron compounds; (2) $CoCl_2$, $Co(NO_3)_2$, $[Co(NH_3)_6]Cl_2$ and like cobalt compounds; (3) $CuCl_2$, $CuSO_4$, $Cu(NO_3)_2$, $Cu(CH_3COO)_2$ and like copper compounds; (4) $ZnCl_2$, $Zn(CH_3COO)_2$ and like zinc compounds; (5) $CrO_3$, $K_2CrO_4$, $K_2Cr_2O_7$, $Na_2CrO_4$, $Na_2Cr_2O_7$, $Cr(NO_3)_3$, $Ag_2CrO_4$, $ZnCrO_4$, $pbCrO_4$ and like chromium compounds; (6) $MnCl_2$, $KMnO_4$, $NaMnO_4$, $Mn(NO_3)_2$ and like manganese compounds; (7) $Ni(NO_3)_2$, $NiSO_4$, $NiCl_2$ and like nickel compounds; and (8) $pbCl_2$, $pb(CH_3COO)_2$, $pb(NO_3)_2$ and like lead compounds. To obtain foamed products having desired hue, compounds of aluminum, phosphorus, etc. may be added to the starting silica gel as desired. Examples of these compounds are $Al_2(SO_4)_3$, $NH_4Al(SO_4)_2$, $KAl(SO_4)_2$, $AlCl_3$, $Al(NO_3)_3$, $Al(SO_4)_2$, $H_3PO_4$, etc.

For the purpose of conducting firing at a lower temperature, flux may be added to the starting silica gel. In fact, when silica gel to which flux is added is fired even at 900°C, effective foaming is ensured to produce desired foamed products, making it possible to obtain foamed products having a higher foaming degree as compared with the case in which silica gel containing no flux is used, as far as the same firing temperature is applied. Preferable firing temperature is in the range of 1000 to 1150°C when flux is used. The prefiring temperature, moreover, may also be lowered by using the flux and 450 to 800°C is applicable for the purpose. Foamed products having higher surface strength can be obtained by raising the prefiring temperature to firing temperature in a shorter period of time and it is preferred to raise the temperature within 20 minutes, as in the case flux is not used. Various known materials may be used as flux, for example, (1) water-soluble alkali metal salts and (2) water-solube boron compounds. The water-soluble alkali metal salts includes lithium, sodium, potassium, rubidium salts of hydrochloric acid, hydrobromic acid, hydroiodic acid, nitric acid, nitrous acid, sulfuric acid, boric acid, phosphoric acid, carbonic acid, chloric acid, bromic acid, acetic acid, tartaric acid and like inorganic or organic acids. Of these salts preferable are alkali metal salts of hydrochloric acid, nitric acid, carbonic acid and boric acid, such as, potassium chloride, sodium chloride, rubidium chloride, potassium iodide, sodium carbonate, potassium carbonate, sodium borate, etc. Besides the alkali metal salts water-soluble boron compounds, such as boric acid, ammonium borate, boron oxide, etc. may be used. Particularly boric acid is desirable since it gives higher luster to the products. These fluxes may be used alone or in admixture with one another.

In adding the coloring material and/or flux to the starting silica gel, the silica gel may be soaked in an aqueous solution of these materials for impregnation and dried to have adsorption water vaporized. As far as the dried silica gel thus obtained has specific surface area of at least 500 m²/g and particle size of not passing a 80-mesh sieve, it is applicable in the invention as the starting material to produce excellent foamed products. In immersing silica gel in the aqueous solution of the additives, it is preferable to use a silica gel containing sufficient adsorption water, since the silica gel containing substantially no adsorption water may be broken by rapid water absorption when immersed in the solution. The concentration of aqueous solution of the additives may vary over wide ranges, but preferable is about 0.0003 to 0.5 percent by mole in coloring materials and about 0.00013 to 3.5 percent by mole in fluxes. The coloring materials contained in the silica gel may be in an amount necessary for coloring the final products and usually in the range of $5.0 \times 10^{-7}$ to $3.0 \times 10^{-4}$ gram atom by metal amount per gram of the dried silica gel. The amount of flux contained in the silica gel is usually $5.0 \times 10^{-7}$ to $1.0 \times 10^{-3}$ gram atom, preferably $2.7 \times 10^{-6}$ to $1.6 \times 10^{-4}$ gram atom, by metal amount per gram of the dried silica gel.

For a better understanding of the invention examples are given below, in which foaming degree, bulk density, hygroscopicity and surface strength are determined in accordance with the following methods.

1. Foaming degree

Foaming degree is determined by the following equation:

$$\text{Foaming degree} = \frac{\text{Volume (ml.) of the foamed silica product}}{\text{Volume (ml.) of the starting silica gel}}$$

2. Bulk density

The foamed product obtained in each example is weighed and the volume thereof is measured by soaking the sample in water to determine the bulk density shown by the following equation:

$$\text{Bulk density} = [\text{Weight (g)}]/[\text{Volume (cm}^3\text{)}]$$

3. Hygroscopicity

The sample is left to stand under a saturated steam pressure at 30°C for 24 hours to measure the amount of sorbed water, and hygroscopicity is determined. The results are shown in following designation:

| | Amount of sorbed water |
|---|---|
| − | 1 % or less |
| + | More than 1 % |

4. Surface strength

In a procelain ball mill, 120 mm in inner diameter, are placed 200 ml of the foamed product obtained in each example and having a particle size of 5 to 10 mesh and 50 steal balls having a diameter of 4 mm. The ball mill is then rotated at a rate of 30 r.p.m. for 10 minutes. Thereafter the amount of the sample not passing a 10-mesh sieve is measured for the determination of surface strength evaluated from the following equation.

$$\text{Surface strength (percent)} = \frac{\text{Amount (g.) of foamed product not passing 10-mesh sieve after test}}{\text{Amount (g.) of foamed product to be tested}} \times 100$$

EXAMPLE 1

In this example were used 8 kinds of silica gel, previously dried at 150°C for 2 hours and having specific surface areas shown in Table 1 below and a particle size of 6 to 10 mesh.

TABLE 1

| No. | Specific surface area m²/g |
|---|---|
| 1 | 380 |
| 2 | 508 |
| 3 | 612 |
| 4 | 690 |
| 5 | 746 |
| 6 | 796 |
| 7 | 837 |
| 8 | 897 |

In an electric furnace was placed each silica gel and prefired at 650°C for 30 minutes to produce a prefired product, the ignition loss thereof being shown in Table 2. The temperature was raised to 1150 to 1200°C in 5 minutes and the prefired product was heated at the temperature for 4 minutes for firing, whereby a foamed product having the properties shown in Table 2 below was obtained.

TABLE 2

| Sample Number | Prefired product | | Foamed product | | | | |
|---|---|---|---|---|---|---|---|
| | Specific surface area, m.²/g. | Ignition loss, percent | Foaming degree | Bulk density, g./cm.² | Specific surface area, m.²/g. | Hygroscopicity | Surface strength, percent |
| 1 | 335 | 1.21 | 0.5 | 1.9 | 60.5 | + | |
| 2 | 453 | 1.09 | 2.0 | 0.57 | 0.31 | − | 96 |
| 3 | 544 | 1.36 | 2.5 | 0.50 | 0.28 | − | 98 |
| 4 | 531 | 1.48 | 3.0 | 0.42 | 0.18 | − | 97 |
| 5 | 586 | 1.34 | 3.6 | 0.39 | 0.21 | − | 97 |
| 6 | 650 | 1.50 | 4.1 | 0.32 | 0.28 | − | 96 |
| 7 | 748 | 1.51 | 3.5 | 0.42 | 0.21 | − | 97 |
| 8 | 726 | 1.65 | 3.5 | 0.40 | 0.26 | − | 96 |

The foamed products Nos. 2 to 8 were free of cracks and high in foaming degree, while no foaming was observed in the product No. 1 prepared from silica gel having a specific surface area of less than 500 m²/g with many cracks produced and marked volume contraction. The foamed products Nos. 2 to 8 were granules covered with lustrous vitrified surface free of cracks and by microscopic observation of the broken surface thereof were observed many open or semi-closed pore defined by vitrified partitions.

EXAMPLE 2

In this example were used 10 kinds of silica gel, previously dried in the same manner as in Example 1 and having specific surface area of 796 m²/g and granular size shown in Table 3 below.

TABLE 3

| No. | Average granular size (mm) |
|---|---|
| 9 | 0.11 (Passing 80-mesh sieve) |
| 10 | 0.20 (Not passing 80-mesh sieve) |
| 11 | 0.28 (Not passing 80-mesh sieve) |
| 12 | 0.53 (Not passing 80-mesh sieve) |
| 13 | 0.85 (Not passing 80-mesh sieve) |
| 14 | 1.32 (Not passing 80-mesh sieve) |
| 15 | 2.49 (Not passing 80-mesh sieve) |
| 16 | 3.65 (Not passing 80-mesh sieve) |
| 17 | 4.33 (Not passing 80-mesh sieve) |
| 18 | 5.69 (Not passing 80-mesh sieve) |

The above silica gel was prefired and then fired in the same manner as in Example 1 to produce foamed products having the properties shown in Table 4.

TABLE 4

| Sample number | Prefired product | | Foamed product | | | |
|---|---|---|---|---|---|---|
| | Specific surface area m.²/g. | Ignition loss, percent | Foaming degree | Bulk density, g./cm.³ | Specific surface area m.²/g. | Hygroscopicity |
| 9 | 664 | 1.11 | 0.6 | 1.6 | 61.9 | + |
| 10 | 656 | 1.21 | 2.0 | 0.57 | 0.29 | − |
| 11 | 648 | 1.30 | 2.0 | 0.57 | 0.28 | − |
| 12 | 632 | 1.42 | 3.0 | 0.43 | 0.23 | − |
| 13 | 669 | 1.48 | 3.5 | 0.38 | 0.31 | − |
| 14 | 672 | 1.69 | 4.0 | 0.35 | 0.20 | − |
| 15 | 650 | 1.50 | 4.1 | 0.32 | 0.28 | − |
| 16 | 675 | 1.45 | 3.7 | 0.39 | 0.24 | − |
| 17 | 702 | 1.82 | 3.2 | 0.43 | 0.23 | − |
| 18 | 699 | 1.60 | 3.4 | 0.41 | 0.21 | − |

The foamed products Nos. 10 to 18 were granules covered with lustrous vitrified surface free of cracks and by microscopic observation of the broken surface thereof were found many open or semi-closed pores defined by vitrified partitions, while no foaming was observed in the product No. 9 prepared from silica gel having a particle size passing an 80-mesh sieve with many cracks and volume contraction.

EXAMPLE 3

Dried silica gel having a particle size of 6 to 10 mesh and a specific surface area of 796 m²/g was prefired under the conditions shown in Table 5 below, then the temperature was raised to 1150°C to 1200°C in 5 minutes, and the prefired product was heated at the temperature for firing, whereby foamed products having the properties shown in Table 5 below were obtained.

TABLE 5

| Sample number | Prefiring conditions | | | Foamed product | | | | |
|---|---|---|---|---|---|---|---|---|
| | Temp. (° C.) | Period (min.) | Ignition loss, percent | Foaming degree | Bulk density, g./cm.³ | Specific surface area, m.²/g. | Hygroscopicity | Surface strength, percent |
| 19 | | | | 1.1 | 0.88 | 0.31 | − | 84 |
| 20 | 450 | 60 | 3.22 | 1.2 | 0.80 | 0.32 | − | 90 |
| 21 | 500 | 60 | 2.48 | 2.0 | 0.57 | 0.27 | − | 93 |
| 22 | 500 | 300 | 1.89 | 3.0 | 0.45 | 0.20 | − | 96 |
| 23 | 550 | 30 | 2.00 | 2.5 | 0.50 | 0.26 | − | 98 |
| 24 | 600 | 30 | 1.80 | 3.0 | 0.45 | 0.27 | − | 98 |
| 25 | 650 | 30 | 1.50 | 4.1 | 0.32 | 0.28 | − | 96 |
| 26 | 700 | 30 | 1.23 | 4.5 | 0.31 | 0.21 | − | 97 |
| 27 | 750 | 30 | 0.90 | 3.6 | 0.39 | 0.25 | − | 95 |
| 28 | 800 | 20 | 0.51 | 4.4 | 0.31 | 0.18 | − | 92 |
| 29 | 800 | 30 | 0.38 | 2.4 | 0.50 | 0.26 | − | 94 |
| 30 | 850 | 10 | 0.48 | 3.5 | 0.40 | 0.26 | − | 92 |
| 31 | 850 | 20 | 0.32 | 2.4 | 0.51 | 0.24 | − | 93 |
| 32 | 900 | 6 | 0.41 | 3.2 | 0.45 | 0.21 | − | 93 |
| 33 | 900 | 15 | 0.30 | 2.0 | 0.58 | 0.21 | − | 93 |

The foamed products Nos. 21 to 33 were white granules covered with lustrous vitrified surface and by microscopic observation of the broken surface thereof were found many open or semi-closed cells defined by vitrified partitions, while the product No. 19, not prefired but directly fired, and the product No. 20, prefired at 450°C, were very poor in foaming degree with many cracks produced in firing step.

EXAMPLE 4

Dried silica gel having a particle size of 6 to 10 mesh and a specific surface area of 796 m²/g was prefired at 650°C for 30 minutes to produce prefired product whose ignition loss was 0.5 to 2.0 percent by weight. Then the temperature was raised to firing temperature shown in Table 6 below in 5 minutes and the product was fired at the temperature for 4 minutes, whereby foamed products having the properties shown in Table 6 below were obtained.

TABLE 6

| Sample number | Firing temperature (°C.) | Foamed product ||||| 
|---|---|---|---|---|---|---|
| | | Foaming degree | Bulk density, g./cm.³ | Specific surface area, m.²/g. | Hygroscopicity | Surface strength, percent |
| 34 | 900 | 0.7 | 1.4 | 146 | + | |
| 35 | 950 | 1.0 | 0.95 | 0.32 | − | 100 |
| 36 | 1,000 | 1.8 | 0.59 | 0.22 | − | 100 |
| 37 | 1,050 | 2.0 | 0.57 | 0.23 | − | 99 |
| 38 | 1,100 | 3.0 | 0.44 | 0.23 | − | 99 |
| 39 | 1,150 | 3.8 | 0.37 | 0.28 | − | 98 |
| 40 | 1,200 | 4.1 | 0.32 | 0.28 | − | 96 |
| 41 | 1,250 | 4.0 | 0.35 | 0.20 | − | 98 |
| 42 | 1,300 | 3.7 | 0.37 | 0.24 | − | 98 |
| 43 | 1,350 | 2.8 | 0.47 | 0.23 | − | 94 |
| 44 | 1,400 | 2.0 | 0.57 | 0.20 | − | 91 |
| 45 | 1,450 | 1.8 | 0.60 | 0.17 | − | 90 |

The dried silica gel was prefired in the same manner as in Example 4, then the temperature was raised to the firing temperature shown in Table 7 below in 5 minutes and the prefired product was heated at the temperatures for firing, whereby foamed product having the properties shown in Table 7 below.

TABLE 7

| Sample number | Firing temperature (°C.) | Foamed product ||||| 
|---|---|---|---|---|---|---|
| | | Foaming degree | Bulk density, g./cm.³ | Specific surface area, m.²/g. | Hygroscopicity | Surface strength, percent |
| 46 | 800 | 0.8 | 1.28 | 183 | + | 100 |
| 47 | 850 | 1.0 | 0.96 | 0.30 | − | 100 |
| 48 | 900 | 1.8 | 0.59 | 0.22 | − | 99 |
| 49 | 950 | 3.4 | 0.40 | 0.21 | − | 97 |
| 50 | 1,000 | 5.5 | 0.25 | 0.18 | − | 97 |
| 51 | 1,050 | 4.4 | 0.31 | 0.17 | − | 97 |
| 52 | 1,100 | 3.2 | 0.45 | 0.20 | − | 97 |
| 53 | 1,150 | 2.4 | 0.51 | 0.21 | − | 97 |
| 54 | 1,200 | 2.6 | 0.50 | 0.22 | − | 97 |

EXAMPLE 6

One hundred cc of silica gel was soaked in an aqueous bath shown in Table 8 below at 60°C for 10 minutes and dried in the same manner as in Example 1. The dried silica gel had a particle size of 6 to 10 mesh and a specific surface area of 756 m²/g.

The dried silica gel was prefired at 600°C for 60 minutes to produce prefired product whose ignition loss was 0.5 to 2.0 percent by weight, then the temperature was raised to 1050°C in 5 minutes and the prefired product was heated at this temperature for 4 minutes, whereby a foamed product of the properties shown in Table 8 was obtained.

TABLE 8

| Sample number | Bath || Foamed product ||||||
|---|---|---|---|---|---|---|---|---|
| | Additive | Concentration mol./l. | Foaming degree | Bulk density, g./cm.³ | Specific surface area, m.²/g. | Hygroscopicity | Color | Surface strength, percent |
| 55 | H₃BO₃ / KNO₃ | 0.647 / 0.095 | 4.7 | 0.35 | 0.20 | − | White | 99 |
| 56 | H₃BO₃ / K₂CO₃ | 0.647 / 0.030 | 2.7 | 0.48 | 0.26 | − | do | 100 |
| 57 | H₃BO₃ / KMnO₄ | 0.647 / 0.061 | 2.8 | 0.48 | 0.27 | − | do | 100 |
| 58 | H₃BO₃ / KI | 0.647 / 0.029 | 2.3 | 0.52 | 0.21 | − | do | 99 |
| 59 | H₃BO₃ / NaCl | 0.647 / 0.082 | 3.0 | 0.45 | 0.21 | − | do | 99 |
| 60 | H₃BO₃ / RbCl | 0.647 / 0.147 | 5.3 | 0.26 | 0.27 | − | do | 97 |
| 61 | H₃BO₃ / Na₂SiF₆ | 0.647 / 0.025 | 2.0 | 0.57 | 0.20 | − | do | 97 |
| 62 | H₃BO₃ / LiNO₃ | 0.647 / 0.139 | 2.0 | 0.56 | 0.12 | − | do | 98 |
| 63 | H₃BO₃ / AgNO₃ | 0.647 / 0.028 | 1.9 | 0.58 | 0.21 | − | Partially yellow | 99 |
| 64 | Na₂B₄O₇ | 0.024 | 2.7 | 0.47 | 0.30 | − | White | 98 |

From the above results it is seen that the effective foaming took place at a firing temperature of 1000°C to 1450°C, particularly at 1100 to 1300°C.

EXAMPLE 5

Silica gel was soaked in an aqueous solution containing 1.4 mol/l of boric acid and 0.4 mole/l of potassium chloride for 10 minutes and dried in the same manner as in Example 1. The dried silica gel had a particle size of 6 to 10 mesh and a specific surface area of 796 m²/g.

EXAMPLE 7

One hundred cc of silica gel was soaked in an aqueous bath shown in Table 9 below at 60°C for 10 minutes and dried in the same manner as in Example 1. The dried silica gel had a particle size of 6 to 10 mesh and a specific surface area of 756 m²/g.

The dried silica gel was prefired and then fired under the conditions shown in Table 9 below. The time required for raising prefiring temperature to firing temperature was 5 minutes.

TABLE 9

| Sample number | Bath Additives | Concentration, mol./l. | Prefiring conditions Temp. (°C.) | Prefiring conditions Time (min.) | Firing Temp. (°C.) | Firing Time (min.) | Foamed product Foaming degree | Foamed product Specific surface area, g./cm.³ | Foamed product Color | Foamed product Surface strength, percent |
|---|---|---|---|---|---|---|---|---|---|---|
| 65 | KCl | 0.098 | 650 | 20 | 1,050 | 6 | 3.0 | 0.45 | White | 97 |
| 66 | H₃BO₃<br>KCl<br>ZnCl₂<br>K₂Cr₂O₇ | 0.970<br>0.210<br>0.110<br>0.051 | 650 | 30 | 1,050 | 6 | 5.0 | 0.28 | Yellow | 97 |
| 67 | H₃BO₃<br>KCl<br>CoCl₂<br>K₂Cr₂O₇ | 0.970<br>0.210<br>0.380<br>0.034 | 650 | 30 | 1,050 | 8 | 5.1 | 0.28 | Greenish brown | 97 |
| 68 | H₃BO₃<br>KNO₃<br>FeCl₃<br>Zn(CH₃COO)₂ | 0.970<br>0.196<br>0.123<br>0.162 | 650 | 30 | 1,050 | 8 | 5.7 | 0.23 | Reddish brown | 97 |

EXAMPLE 8

Dried silica gel having a particle size of 6 to 10 mesh and a specific surface area of 796 m²/g was fired at 650°C for 60 minutes to produce a prefired product whose ignition loss was 0.5 to 2.0 percent by weight, then the temperature was raised to 1200°C in the period shown in Table 10 below, and the prefired product was heated at the temperature for 4 minutes for firing, whereby a foamed product having properties shown in Table 10 below was obtained.

TABLE 10

| Sample No. | Time required for raising prefiring Temp. to firing Temp. (min.) | Foaming degree | Surface strength (%) |
|---|---|---|---|
| 69 | 5 | 4.0 | 96 |
| 70 | 15 | 4.0 | 93 |
| 71 | 30 | 3.8 | 84 |

What we claim is:

1. A method for manufacturing foamed product of silica from silica gel which comprises prefiring silica gel at a temperature ranging from 500 to 900°C so as to obtain a prefired product which can be ignited with a loss of not more than 5 % by weight, the silica gel having a specific surface area of at least 500 m²/g and being of a size not passing through an 80-mesh sieve and substantially free of adsorption water, and thereafter firing the prefired product at a temperature ranging from 1000 to 1450°C to effect foaming.

2. The method according to claim 1, in which said silica gel has a specific surface area of 600 to 900 m²/g.

3. The method according to claim 1, in which said silica gel passes through a 5-mesh sieve but do not pass through a 24-mesh sieve.

4. The method according to claim 1, in which silica gel is prefired at a temperature ranging from 550 to 750°C.

5. The method according to claim 1, in which said prefired product shows ignition loss of 0.5 to 2.5 weight percent.

6. The method according to claim 1, in which said prefired product is fired at a temperature ranging from 1100 to 1300°C.

7. The method according to claim 1, in which said prefiring temperature is raised to said firing temperature within 20 minutes.

8. The method according to claim 7, in which said period for raising the prefired temperature to fired temperature is within 10 minutes.

9. The method according to claim 1, in which said silica gel is impregnated with a coloring material to produce colored foamed product.

10. The method according to claim 9, in which said coloring material is at least one water-soluble salts of a metal selected from the group consisting of iron, cobalt, copper, zinc, chromium, manganese, nickel and lead.

11. The method according to claim 1, in which said silica gel is impregnated with a flux and pre-fired at 450 to 800°C and then fired at 900 to 1450°C.

12. The method according to claim 11, in which said flux is at least one species selected from the group consisting of a water-soluble alkali metal salt and a water-soluble boron compound.

13. The method according to claim 11, in which said firing temperature is in the range of 1000 to 1150°C.

14. A granular foamed product of silica which is produced from silica gel by the method of claim 1 and comprises a vitrified surface and a great number of open or semi-closed pores defined by vitrified patitions.

* * * * *